(12) United States Patent
Yamagishi

(10) Patent No.: US 10,869,072 B2
(45) Date of Patent: Dec. 15, 2020

(54) AUDIO-VISUAL QUALITY ESTIMATION DEVICE, METHOD FOR ESTIMATING AUDIO-VISUAL QUALITY, AND PROGRAM

(71) Applicant: NIPPON TELEGRAPH AND TELEPHONE CORPORATION, Chiyoda-ku (JP)

(72) Inventor: Kazuhisa Yamagishi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 78 days.

(21) Appl. No.: 15/776,425

(22) PCT Filed: Nov. 30, 2016

(86) PCT No.: PCT/JP2016/085553
§ 371 (c)(1),
(2) Date: May 16, 2018

(87) PCT Pub. No.: WO2017/104416
PCT Pub. Date: Jun. 22, 2017

(65) Prior Publication Data
US 2018/0332326 A1  Nov. 15, 2018

(30) Foreign Application Priority Data

Dec. 16, 2015  (JP) .................................. 2015-244983
Aug. 17, 2016  (JP) .................................. 2016-160182

(51) Int. Cl.
*H04N 21/24* (2011.01)
*G10L 25/60* (2013.01)
(Continued)

(52) U.S. Cl.
CPC ......... *H04N 21/2407* (2013.01); *G10L 25/60* (2013.01); *H04N 17/00* (2013.01);
(Continued)

(58) Field of Classification Search
None
See application file for complete search history.

(56) References Cited

U.S. PATENT DOCUMENTS

2009/0096874 A1*  4/2009  Hayashi .............. H04N 17/004
                                                          348/192
2012/0117225 A1*  5/2012  Kordasiewicz ..... H04L 65/1083
                                                          709/224
(Continued)

FOREIGN PATENT DOCUMENTS

EP    2 106 153 A1    9/2009
JP    2004-172753 A   6/2004
(Continued)

OTHER PUBLICATIONS

Combined Office Action and Search Report dated Jan. 18, 2019 in Russian Patent Application No. 2018118746/07(029291), 13 pages (with English translation of the Office Action and English translation of categories of cited documents).
(Continued)

*Primary Examiner* — Samira Monshi
(74) *Attorney, Agent, or Firm* — Oblon, McClelland, Maier & Neustadt, L.L.P.

(57) ABSTRACT

An audio-visual quality estimation device includes: an audio quality estimator to estimate audio quality for each unit time starting from a playback start time of an audio-visual content, based on a parameter affecting audio quality among parameters related to the content; a video quality estimator to estimate video quality for each unit time, based on a parameter affecting video quality among the parameters related to the content; a unit time quality estimator to unify the audio quality and video quality for each unit time, to estimate audio-visual quality for each unit time; an encoding quality estimator to unify the audio-visual quality for the unit times into one value, to estimate audio-visual encoding (Continued)

quality with respect to encoding degradation, considering temporal quality fluctuation; and an audio-visual quality estimator to estimate the audio-visual quality perceived by a viewer after an end of the content, based on the audio-visual encoding quality.

6 Claims, 7 Drawing Sheets

(51) Int. Cl.
*H04N 19/154* (2014.01)
*H04N 17/00* (2006.01)
*H04N 17/02* (2006.01)

(52) U.S. Cl.
CPC ........... *H04N 17/004* (2013.01); *H04N 17/02* (2013.01); *H04N 19/154* (2014.11); *H04N 21/24* (2013.01)

(56) References Cited

U.S. PATENT DOCUMENTS

2015/0009406 A1 1/2015 Sun et al.
2015/0341634 A1 11/2015 Jiang

FOREIGN PATENT DOCUMENTS

| JP | 2007-194893 A | 8/2007 |
| JP | 2015-122638 A | 7/2015 |
| JP | 2015-520548 A | 7/2015 |
| JP | 2015-154234 A | 8/2015 |
| RU | 2 420 022 C2 | 5/2011 |

OTHER PUBLICATIONS

Extended European Search Report dated Jul. 22, 2019, in Patent Application No. 16875400.0, 6 pages.
International Search Report dated Feb. 21, 2017 in PCT/JP2016/085553 filed Nov. 30, 2016.
"Subjective video quality assessment methods for multimedia applications," Series P: Telephone Transmission Quality, Telephone Installations, Local Line Networks, International Telecommunication Union, Recommendation ITU-T P. 910, Apr. 2008, 42 total pages.
"Parametric non-intrusive assessment of audiovisual media streaming quality," Series P: Terminals and Subjective and Objective Assessment Methods, International Telecommunication Union, Prepublished Recommendation ITU-T P. 1201, Oct. 2012, 26 total pages.

* cited by examiner (1)

Chunk 1
- abr 128 kbps
- vbr 1,500 kbps
- fr 30 fps
- rs 1920 × 1080 pixels

Chunk 2
- abr 64 kbps
- vbr 300 kbps
- fr 15 fps
- rs 640 × 360 pixels (2) LENGTH OF CONTENT OF ORIGINAL: 60 s
LENGTH OF CONTENT T, USED FOR QUALITY ESTIMATION: 60 s

| t | abr | vbr | fr | rs | |
|---|-----|-------|----|-------------|---------|
| 1 | 128 | 1,500 | 30 | 1920 × 1080 | Chunk 1 |
| 2 | 128 | 1,500 | 30 | 1920 × 1080 | Chunk 1 |
| 3 | 128 | 1,500 | 30 | 1920 × 1080 | Chunk 1 |
| 4 | 128 | 1,500 | 30 | 1920 × 1080 | Chunk 1 |
| 5 | 128 | 1,500 | 30 | 1920 × 1080 | Chunk 1 |
| 6 | 64  | 300   | 15 | 640 × 360   | Chunk 2 |
| 7 | 64  | 300   | 15 | 640 × 360   | Chunk 2 |
| 8 | 64  | 300   | 15 | 640 × 360   | Chunk 2 |
| 9 | 64  | 300   | 15 | 640 × 360   | Chunk 2 |
| 10| 64  | 300   | 15 | 640 × 360   | Chunk 2 |
| ⋮ |     |       |    |             |         |

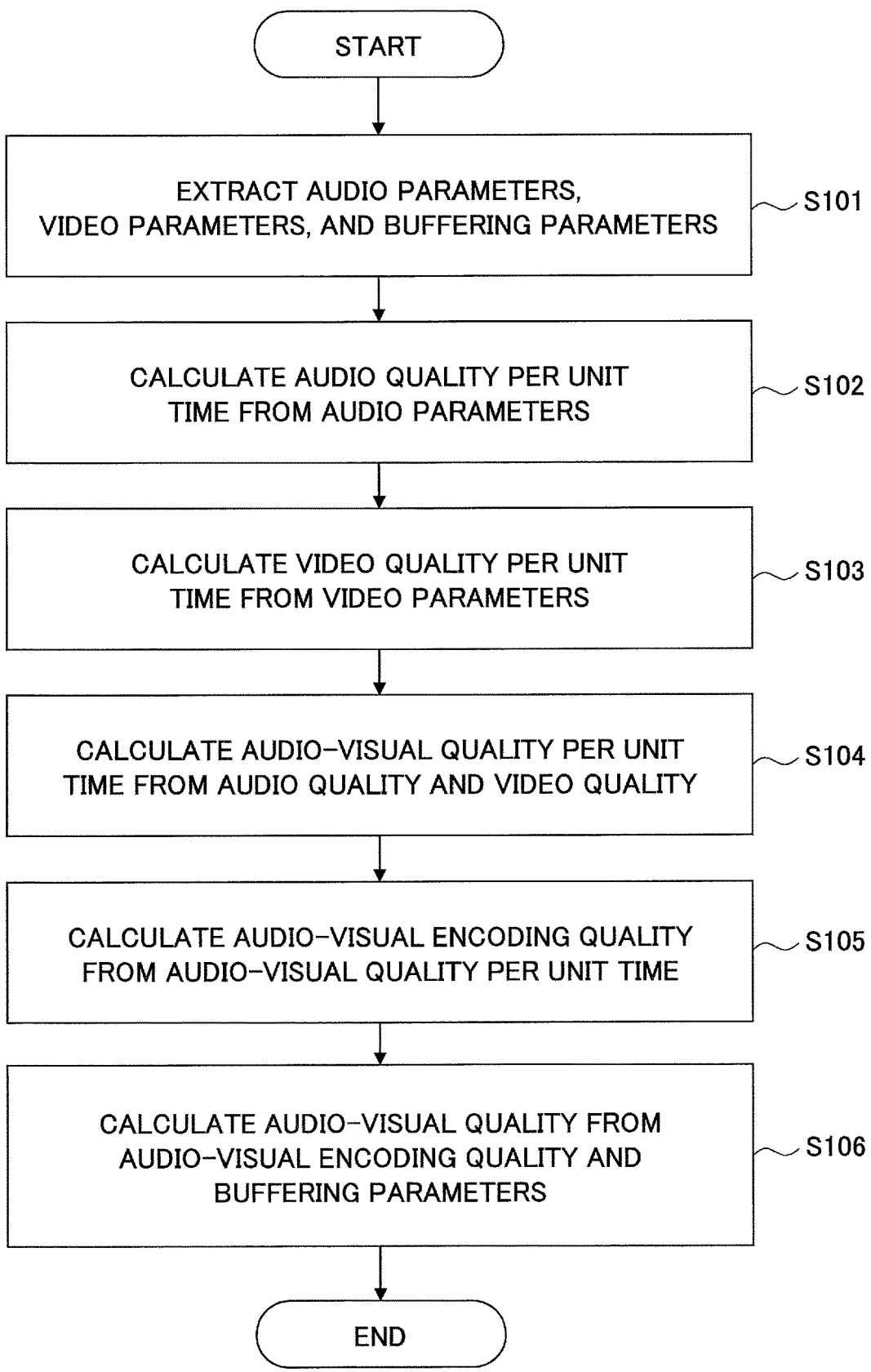

AUDIO-VISUAL QUALITY ESTIMATION DEVICE, METHOD FOR ESTIMATING AUDIO-VISUAL QUALITY, AND PROGRAM

TECHNICAL FIELD

The present invention relates to an audio-visual quality estimation device, a method for estimating audio-visual quality, and a program.

BACKGROUND ART

Video communication services have been spreading that transmit video media including video and audio (including voice, hereafter) through the Internet between terminals or between a server and a terminal.

Since the Internet is a network in which communication quality is not necessarily guaranteed, when executing communication using audio media and/or video media, the bit rate may be reduced due to a narrow transmission line bandwidth between a viewer's terminal and a network, or packet loss, packet transfer delay, and packet resending may occur due to congestion on transmission lines. In such a case, quality perceived by a viewer or a listener may be degraded with respect to audio media, video media, and the like.

Specifically, since a video cannot be distributed by an excessive bit rate through the network, encoding is performed on an original video, and this encoding of the original video may introduce an occurrence of a degraded video signal in a frame due to a process executed by units of blocks, or may have high-frequency components of the video signal dropped, by which fidelity to detail of the entire video becomes reduced. Also, since the distribution bit rate cannot be maintained the resolution of a video may be reduced; fidelity to detail becomes reduced; and the continuity of video cannot be maintained due to a reduced frame rate, which may result in a discontinuous video. Also, when transmitting encoded video data as packets to a viewer's terminal through the network, if packet loss or disposal occurs, degradation may occur in a frame, or the throughput or the like may decline. In such a case, packets may not reach the destination by an expected timing for playback, and the data capacity in a buffer in a viewer's terminal may become insufficient, and thereby, the playback of the video stops.

Similarly, regarding audio, since audio cannot be distributed by an excessive bit rate through the network, encoding is performed on an original audio, and this encoding of the original audio may have high-frequency components of the audio dropped, by which clarity of the audio may be lost. Also, similar to the case of video, when transmitting encoded audio data as packets to a listener's terminal through the network, if packet loss or disposal occurs, distortion may occur in audio, or the throughput or the like may decline. In such a case, packets may not reach the destination by an expected timing for playback, and the data capacity in a buffer in a listener's terminal may become insufficient, and thereby, the playback of the audio stops.

As a result, a viewer or a listener perceives video degradation or audio degradation and perceives degradation of the audio-visual quality.

In order for a service provider to confirm that a video communication service as described above is being provided in good quality, it is important to measure audio-visual quality physically experienced by viewers while the service is being provided so as to monitor the audio-visual quality provided to the viewers.

Therefore, an audio-visual quality estimation technology is needed that is capable of properly representing audio-visual quality perceived by a viewer.

Conventionally, as methods of evaluating audio-visual quality, there have been subjective quality assessment methods (see, for example, Non-patent document 1) and objective quality assessment methods (see, for example, Non-patent document 2).

In a subjective quality assessment method, quality perceived by multiple viewers who actually viewed videos is evaluated on a five-grade (may be nine-grade or eleven-grade) quality scale (excellent, good, fair, poor, very poor), a degradation scale (no degradation recognized, non-bothering degradation recognized, slightly bothering degradation, bothering degradation, very bothering degradation), and the like, and a mean quality assessment value of the videos (e.g., videos having 0% of packet loss rate and the bit rate of 2 Mbps) is obtained with respect to the total number of viewers as subjects, and defines the value as an MOS (Mean Opinion Score) value or a DMOS (Degradation Mean Opinion Score) value.

However, a subjective quality assessment needs not only special, dedicated equipment (monitors etc.) and an evaluation environment (indoor illuminance, indoor noise, etc.), but also many viewers who actually evaluate video and audio. Therefore, it may take a long time until the viewers will actually have completed the evaluation, and hence, is not suitable to evaluate quality in real time.

Thereupon, development has been desired for an objective quality assessment method that uses feature values that affect video quality and audio quality (e.g., bit rate, packet loss information, etc.), and outputs an audio-visual quality assessment value.

As one of the conventional objective quality assessment methods, there has been a technology that receives as input transmitted packets and setting values obtained from a service provider or the like, and derives an audio-visual quality assessment value for a short time (e.g., about 10 seconds) compared to the length of a real content (e.g., 30 minutes, one hour, two hours, etc.), while considering to what extent degradation will be propagated due to loss of video frames caused by packet loss (see, for example, Non-patent document 2).

As described above, conventional objective quality assessment methods tend to estimate audio-visual quality assessment values for a short time by using packets.

RELATED ART DOCUMENTS

Non-Patent Documents

Non-patent document 1: "Subjective video quality assessment methods for multimedia applications", ITU-T p.910

Non-patent document 2: "Parametric non-intrusive assessment of audiovisual media streaming quality", ITU-T p.1201

SUMMARY OF INVENTION

Problem to be Solved by the Invention

However, the technology of Non-patent document 2 assumes, for example, estimation of audio-visual quality for about 10 seconds, and aims at a video communication service distributed by a fixed bit rate. Therefore, it is difficult to apply the technology to quality estimation of a service in which the bit rate varies with time and the audio-visual quality varies with time (e.g., HLS (HTTP Live Streaming) and MPEG-DASH). Specifically, Non-patent document 2 that assumes estimation of short-time audio-visual quality, does not assume significant temporal fluctuation of the quality as illustrated in FIG. 1. Therefore, it is difficult to estimate audio-visual quality in such a situation (Problem 1).

Also, since Non-patent document 2 aims at estimation of audio-visual quality for a short time, it is difficult to apply the technology to estimation of audio-visual quality of a long-time content (e.g., a video of several minutes long, an animation of 30 minutes long, a movie of 2 hours long, etc.) at a point of time when a viewer finishes viewing the content in the end. Specifically, when a viewer has viewed a long-time content, impression on an earlier part of the content becomes dimmer, whereas impression on a recent part remains clearer (forgetting effect/recency effect). However, in Non-patent document 2, it is not taken into consideration that the temporal weight to quality becomes greater while time elapses (Problem 2).

Also, in Non-patent document 2, it is not taken into consideration that a state in which the audio-visual quality is lower has a stronger influence on the eventual audio-visual quality than a state in which the audio-visual quality is higher (Problem 3).

Also, in Non-patent document 2, although audio-visual quality is estimated in consideration of encoding degradation of an audio-visual content, number of playback stallings, playback stalling time, and playback stalling intervals of the audio-visual content, due to the assumption of short-time fluctuation, a relationship between the time length of an audio-visual content and the playback stalling time is not considered. For example, even for a playback stalling time of 10 seconds, comparing a 10-second audio-visual content with a one-hour audio-visual content, influence on the audio-visual quality differs significantly (the former has a very low audio-visual quality because the playback stalling for 10 seconds occurred in the content of 10 seconds long, whereas the latter may maintain a high audio-visual quality because the playback stalling for 10 seconds occurred in the content of one hour long), but such an influence is not taken into consideration. The content length is not considered similarly with respect to the number of playback stallings and playback stalling intervals (Problem 4).

The present invention has been made in view of the above respects, and has an object to enable quality evaluation even in a case where audio-visual quality changes with time.

Means for Solving the Problem

Thereupon, in order to solve the above problems, an audio-visual quality estimation device includes an audio quality estimator configured to estimate audio quality for each unit time starting from a playback start time of an audio-visual content, based on a parameter that affects the audio quality among parameters related to the content; a video quality estimator configured to estimate video quality for said each unit time, based on a parameter that affects the video quality among the parameters related to the content; a unit time quality estimator configured to unify the audio quality and the video quality for said each unit time, to estimate audio-visual quality for said each unit time; an encoding quality estimator configured to unify the audio-visual quality for the unit times into one value, to estimate audio-visual encoding quality with respect to encoding degradation, in which temporal quality fluctuation is taken into consideration; and an audio-visual quality estimator configured to estimate the audio-visual quality perceived by a viewer after an end of the content, based on the audio-visual encoding quality.

Advantage of the Invention

It is possible to enable quality evaluation even in a case where audio-visual quality changes with time.

BRIEF DESCRIPTION OF DRAWINGS

FIG. 7 is a flowchart for illustrating an example of processing steps executed by the audio-visual quality estimation device.

EMBODIMENTS OF THE INVENTION

Figure 1:
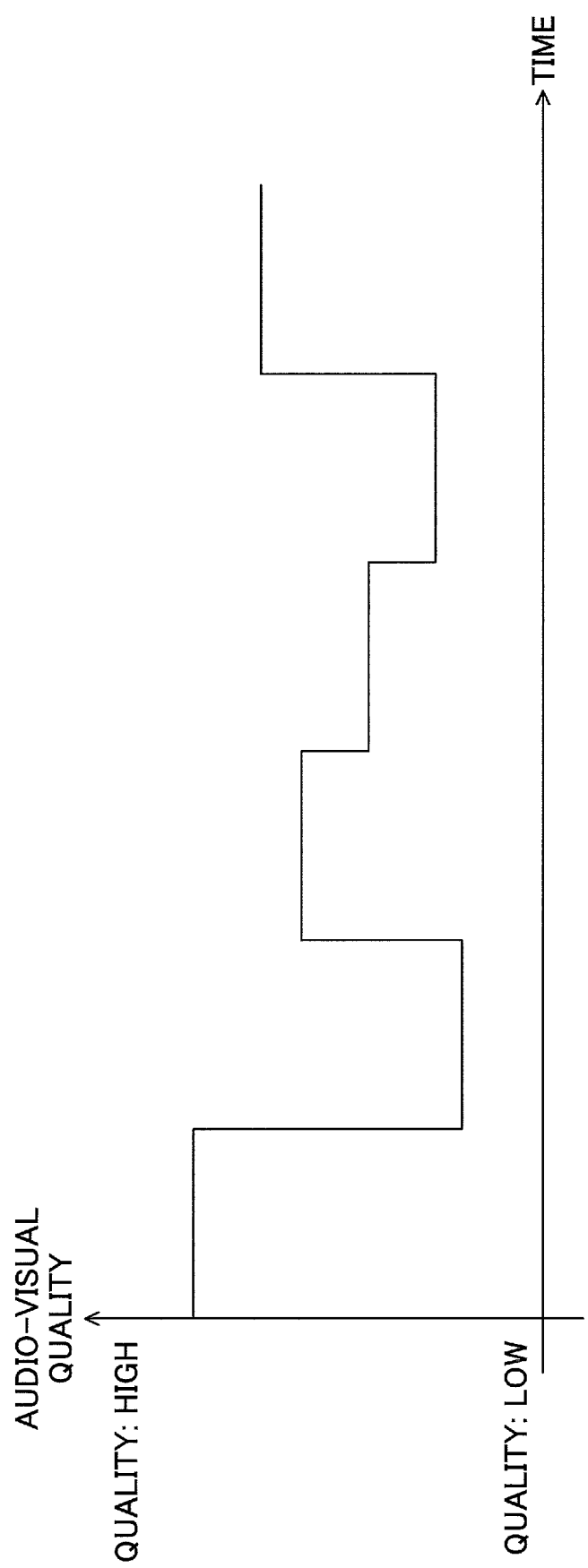
FIG. 1 is a diagram illustrating temporal fluctuation of audio-visual quality.
Figure 2:
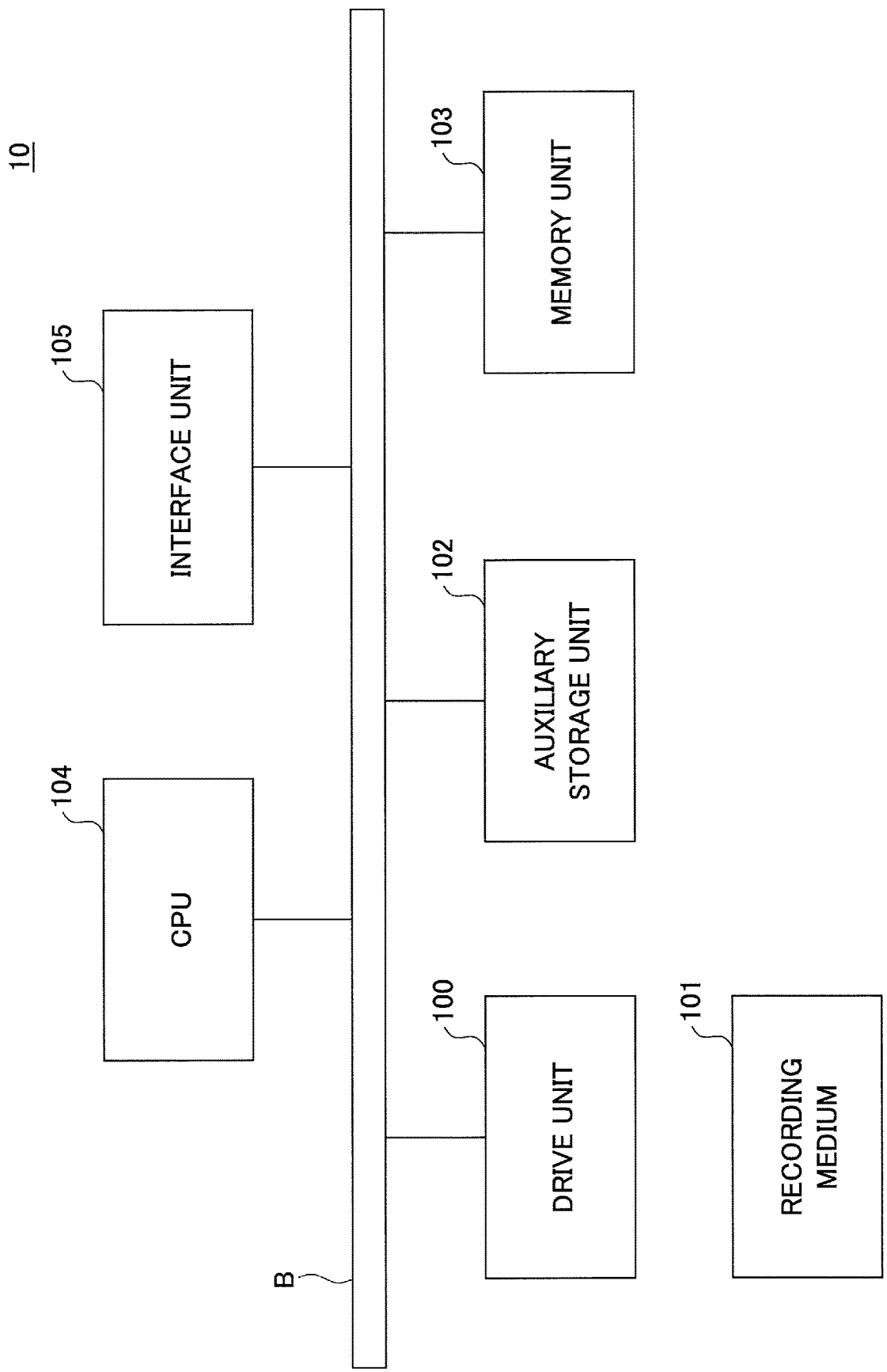
FIG. 2 is a diagram illustrating an example of a hardware configuration of an audio-visual quality estimation device in an embodiment of the present invention.

In the following, embodiments will be described with reference to the drawings. FIG. 2 is a diagram illustrating an example of a hardware configuration of an audio-visual quality estimation device in an embodiment of the present invention. The audio-visual quality estimation device 10 in FIG. 2 includes a drive unit 100, an auxiliary storage unit 102, a memory unit 103, a CPU 104, and an interface unit 105, which are mutually connected by a bus B.

A program that implements processing on the audio-visual quality estimation device 10 is provided with a recording medium 101 such as a flexible disk or a CD-ROM. Once the recording medium 101 storing the program is set in the drive unit 100, the program is installed into the auxiliary storage unit 102 from the recording medium 101 via the drive unit 100. However, installation of the program is not necessarily executed from the recording medium 101, and may also be downloaded from another computer via the network. Also, the program may be installed as a part of another program. The auxiliary storage unit 102 stores the installed program, and stores required files, data, and the like as well.

Upon receiving a command to activate the program, the memory unit 103 reads the program from the auxiliary storage unit 102, to load the program. The CPU 104 executes functions related to the audio-visual quality estimation device 10 according to the program stored in the memory unit 103. The interface unit 105 is used as an interface for connecting with a network.

Figure 3:
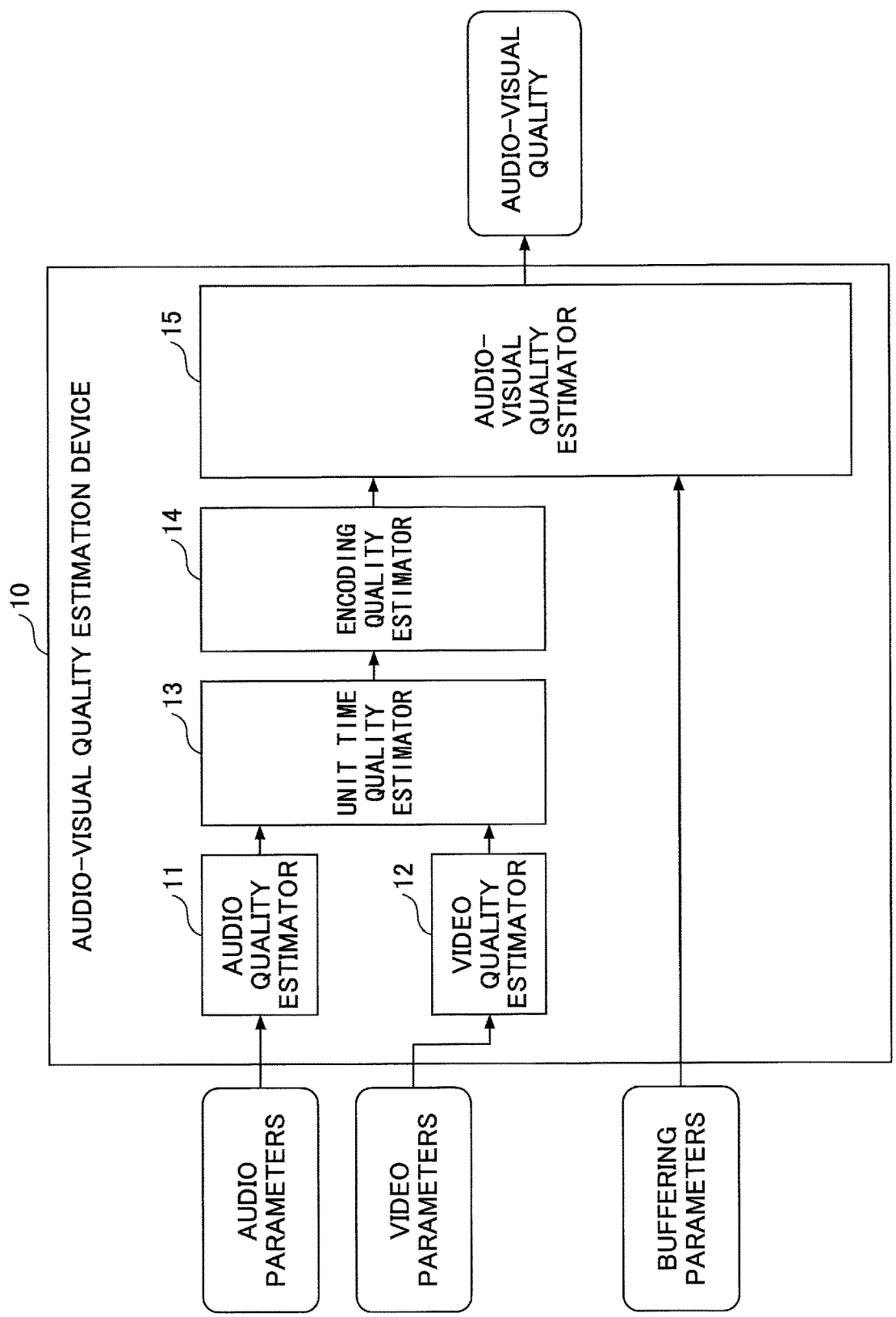
FIG. 3 is a diagram illustrating an example of a functional configuration of an audio-visual quality estimation device in an embodiment of the present invention.

FIG. 3 is a diagram illustrating an example of a functional configuration of the audio-visual quality estimation device in the embodiment of the present invention. In FIG. 3, the audio-visual quality estimation device 10 includes an audio quality estimator 11, a video quality estimator 12, a unit time quality estimator 13, an encoding quality estimator 14, and an audio-visual quality estimator 15, in order to estimate audio-visual quality perceived by a viewer in the end with respect to an audio-visual content (simply referred to as a "content", below). These units are implemented by processes which one or more programs installed in the audio-visual quality estimation device 10 cause the CPU 104 to execute. In other words, these units are implemented by hardware resources of the audio-visual quality estimation device 10 and programs (software) installed in the audio-visual quality estimation device 10 operating together.

The audio quality estimator 11 calculates, for a content, an estimated value of the audio quality for each unit time (simply referred to as "audio quality", below), based on an audio parameter that affects the audio quality of the content (e.g., audio bit rate, sampling rate, etc.) among parameters related to the content. The unit time is a relatively short time compared to the content length (the time length of the content), for example, one second, five seconds, or 10 seconds.

The video quality estimator 12 calculates, for a content, an estimated value of the video quality for each unit time (simply referred to as "video quality", below), based on a video parameter that affects video quality of the content (e.g., video bit rate, resolution, frame rate, etc.) among parameters related to the content.

The unit time quality estimator 13 calculates, for a content, an estimated value of the audio-visual quality for each unit time (simply referred to as "audio-visual quality", below), based on the audio quality for the unit time output from the audio quality estimator 11, and the video quality for the unit time output from the video quality estimator 12.

The encoding quality estimator 14 calculates, for a content, an estimated value of the audio-visual encoding quality with respect to encoding degradation in which temporal quality fluctuation is taken into consideration (simply referred to as "audio-visual encoding quality", below), based on the audio-visual quality output from the unit time quality estimator 13 for every unit time.

The audio-visual quality estimator 15 calculates, for a content, an estimated value of audio-visual quality (after having viewed the content) perceived by a viewer in the end (simply referred to as "audio-visual quality", below), based on the audio-visual encoding quality output from the encoding quality estimator 14, and buffering parameters related to stalling of an audio-visual playback (e.g., total time of playback stalling time, number of playback stallings, and average value of playback stalling intervals). Note that "playback stalling" here does not mean intentional stop performed by a viewer but a stalling during a playback that occurs due to degradation of quality of the content. Note that the audio-visual quality estimator 15 may calculate the audio-visual quality, further based on the time length (net content length not including stalling time) of an audio-visual content.

Note that input parameters including audio parameters, video parameters, and buffering parameters illustrated in FIG. 3, may be automatically extracted from, for example, packets of a content when transferred on the network and a viewer's terminal (terminal used for viewing the content), or may be extracted from an information source other than packets.

Figure 4:
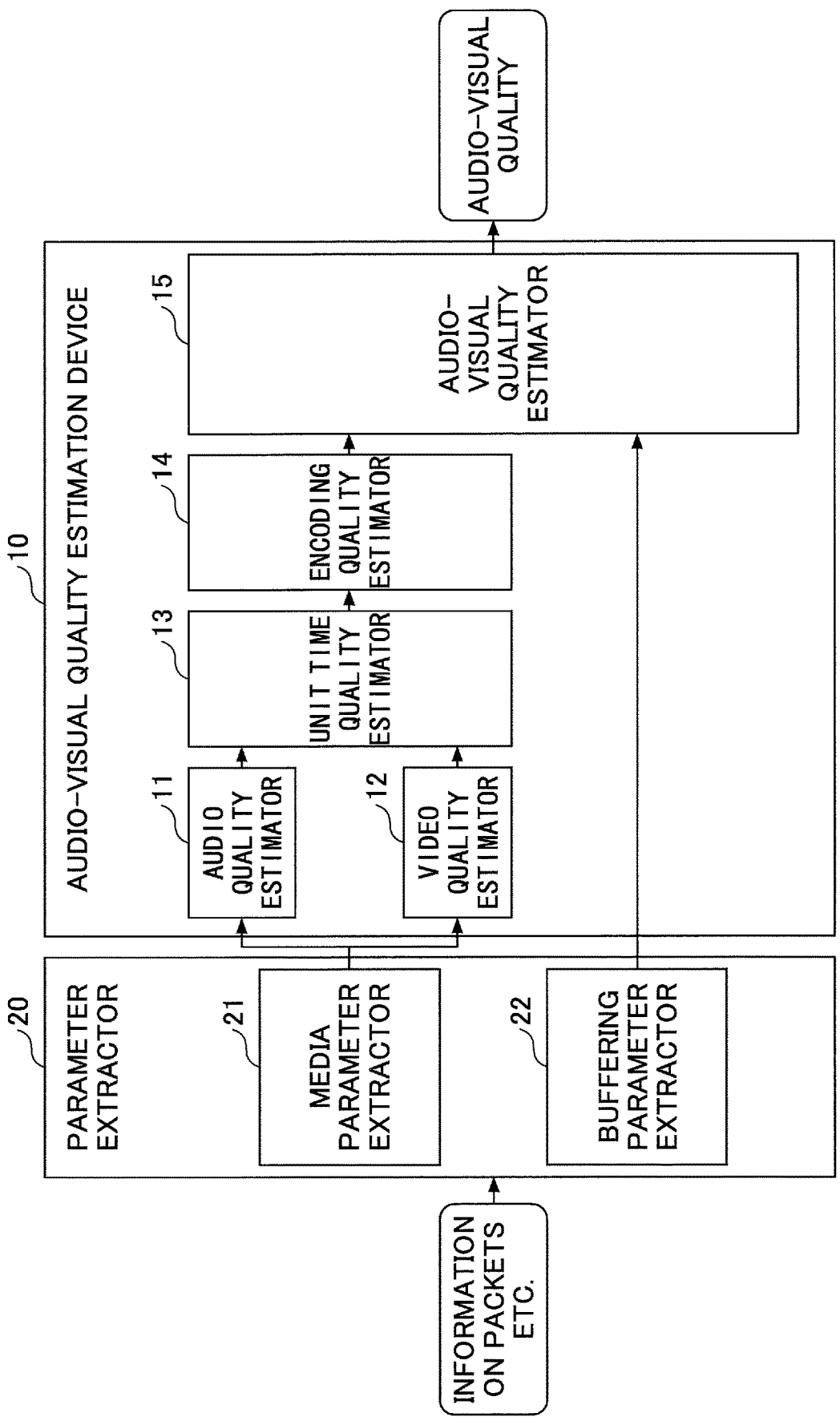
FIG. 4 is a diagram illustrating an example of a functional configuration in a case where input parameters are extracted from packets or the like of a content.

FIG. 4 is a diagram illustrating an example of a functional configuration in a case where input parameters are extracted from packets or the like of a content. In FIG. 4, the same parts as in FIG. 3 are assigned the same reference numerals, and their description will be omitted.

In FIG. 4, a parameter extractor 20 is added compared to FIG. 3. The parameter extractor 20 may be implemented by the audio-visual quality estimation device 10, or may be implemented by a device (a computer) other than audio-visual quality estimation device 10. In either case, the parameter extractor 20 is implemented by a process which a program installed in a computer (the audio-visual quality estimation device 10 or another device) causes a CPU of the device having the program installed to execute.

The parameter extractor 20 uses parameters that can be extracted from one of information owned by a service provider who provides a video communication service, packets to transmit a content, and a viewer's terminal, to extract media parameters (audio parameters and video parameters) and buffering parameters. In FIG. 4, the parameter extractor 20 includes a media parameter extractor 21 and a buffering parameter extractor 22.

The media parameter extractor 21 extracts an audio bit rate as an audio parameter, and extracts a video bit rate, a resolution, and a frame rate as video parameters.

As the method of extracting media parameters in a network (from packets flowing through the network), Segmentation formats and MPD (Media presentation description) may be listed. As the method of extracting media parameters on a viewer's terminal, media parameters may be extracted from Segmentation formats or MPD received on a viewer's terminal, or media parameters may be extracted from a bit stream in which encoding information is described.

Figure 5:
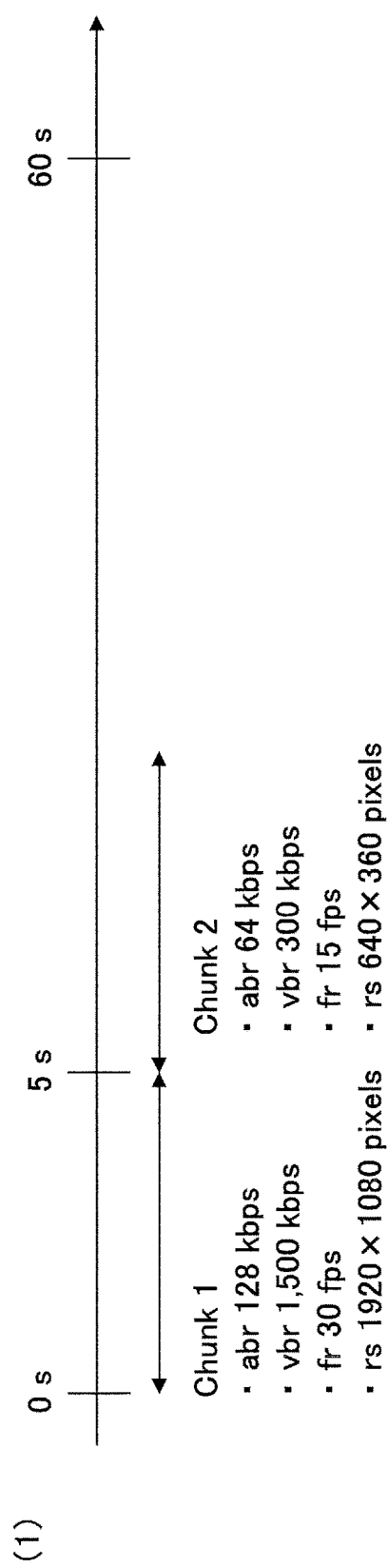
FIG. 5 includes diagrams for illustrating a method of extracting media parameters for each unit time from MPD.

FIG. 5 includes diagrams for illustrating a method of extracting media parameters for each unit time from MPD.

FIG. 5(1) illustrates that the chunk of a content is five seconds long, from which audio bit rate abr, video bit rate vbr, resolution rs, frame rate fr, and the like related to the chunk can be extracted from MPD accompanying the chunk.

FIG. 5(2) illustrates that in a situation as illustrated in FIG. 5(1), and in the case of unit time being one second, it is possible to assign the media parameters of the first chunk (Chunk 1) to each second up to the fifth second, and it is possible to assign the media parameters of the second chunk (Chunk 2) to each second from the sixth to tenth seconds. For each subsequent second, it is possible to similarly assign media parameters extracted from a chunk corresponding to the second.

Note that, for example, as media parameters that affect audio quality and video quality, audio bit rate, video bit rate, resolution, and frame rate can be considered. Since a service provider may set these values to encode a content, the audio-visual quality estimation device 10 may use these setting values directly.

The buffering parameter extractor 22 extracts a total time of playback stallings of a content, a number of playback stallings, and an average value of playback stalling time intervals as buffering parameters.

Figure 6:
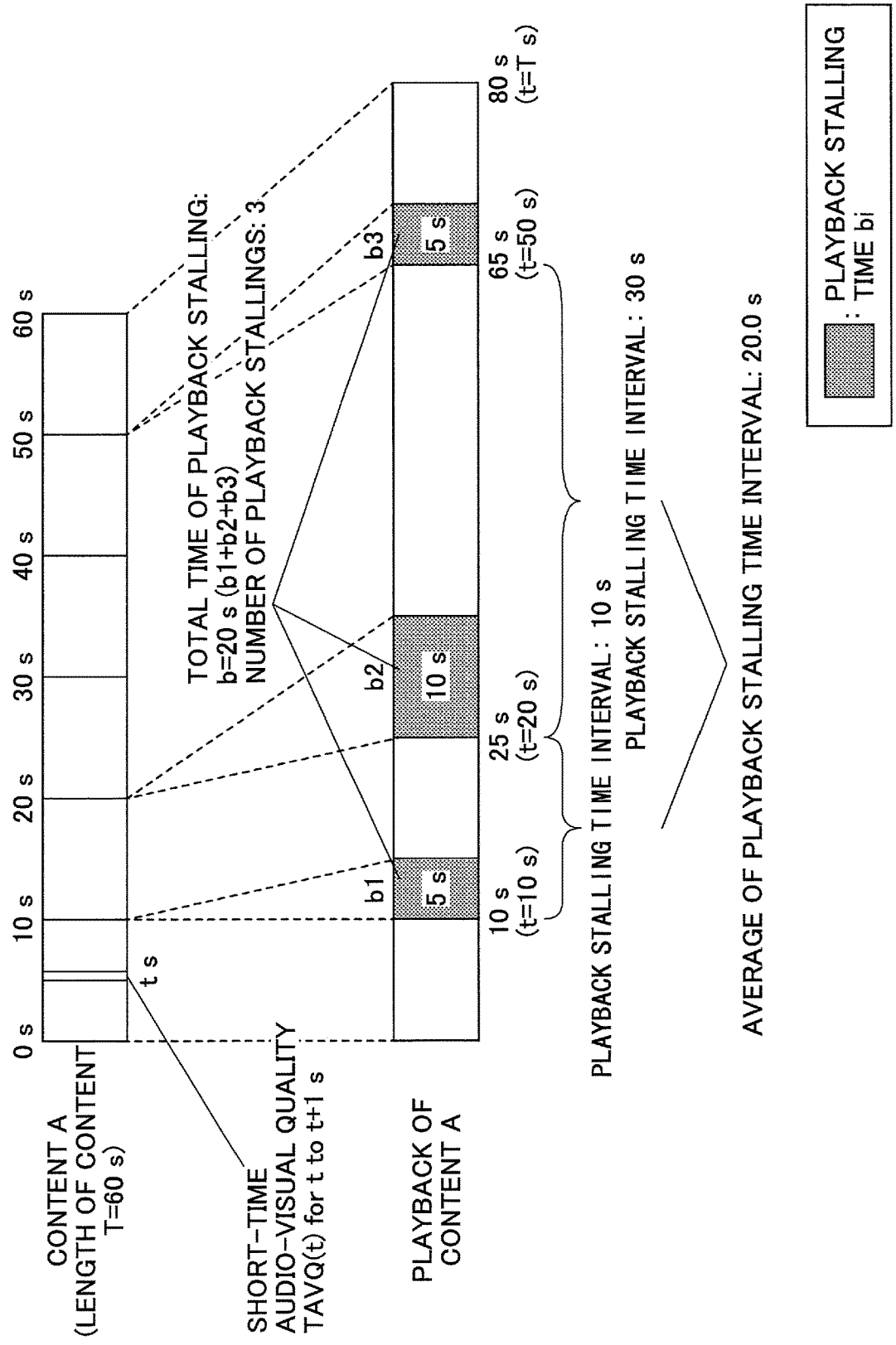
FIG. 6 is a diagram for illustrating buffering parameters.

FIG. 6 is a diagram for illustrating buffering parameters. In the upper part of FIG. 6, a rectangle is illustrated that represents the content length (T=60 seconds) of a content A. In the lower part in FIG. 6, a rectangle is illustrated that represents the time required for a playback of the content A. According to the lower rectangle, at a point of time when 10 seconds have elapsed since the playback start (when playing back the 10th second of the content A), a playback stalling (b1) occurs for 5 seconds; at a point of time when 25 seconds have elapsed since the playback start (when playing back the 20th second of the content A), a playback stalling (b2) occurs for 10 seconds; and at a point of time when 65 seconds have elapsed since the playback start (when playing back the 50th second of the content A), a playback stalling (b3) occurs for 5 seconds. In this case, the total time of playback stallings of the content is 5+10+5=20 seconds (b1+b2+b3), and the number of playback stallings is three times. Also, the interval between the start of the first playback stalling and the start of the second playback stalling is 10 seconds, and the interval between the start of the second playback stalling and the start of the third playback stalling is 30 seconds. Therefore, in this case, the average value of playback stalling time intervals is (10+30)/2=20 seconds. As such, a playback stalling time interval means time from the start of a playback stalling to the start of the next playback stalling. However, in the case of the number of playback stallings being 0 or 1, the average value of playback stalling time intervals is defined to be 0.

When extracting such buffering parameters (total time of playback stalling time, number of playback stallings, and average value of playback stalling intervals) in a network, it is possible to calculate from a receiving buffer capacity of a viewer's terminal under an assumption that the buffer of the viewer's terminal has a fixed capacity. Specifically, since a playback stalling occurs when data is exhausted in the receiving buffer, it is possible to estimate the number of data exhaustion as the number of playback stallings, and it is possible to estimate the start time and the length of a stalling of the content from the bit rate and the capacity of the receiving buffer. When extracting buffering parameters on a viewer's terminal, the buffering parameters may be calculated by detecting an actual stalling time of the content by a player. Since a player executes a playback while grasping the playback time, for example, information of PTS (Presentation time stamp) may be obtained and compared with a present time to grasp the start time of a playback stalling and the playback stalling time length.

In the following, processing steps executed by the audio-visual quality estimation device 10 will be described. FIG. 7 is a flowchart for illustrating an example of processing steps executed by the audio-visual quality estimation device.

Once information of packets related to a content (e.g., all packets used for transferring the content) for which the quality is to be evaluated (simply referred to as the "target content", below) is input into the parameter extractor 20, the media parameter extractor 21 calculates an audio parameter (audio bit rate) that affects the audio quality, and video parameters (video bit rate, resolution, and frame rate) that affect the video quality for each unit time, and the buffering parameter extractor 22 calculates buffering parameters (number of playback stallings, total time of playback stallings, average value of playback stalling intervals) related to buffering (S101). The audio parameter is output to the audio quality estimator 11, the video parameters are output to the video quality estimator 12, and the buffering parameters are output to the audio-visual quality estimator 15.

Then, based on the input audio parameter, the audio quality estimator 11 calculates the audio quality for each unit time for the target content, and outputs the calculated audio quality to the unit time quality estimator 13 (S102).

The audio quality estimator 11 calculates the audio quality $AQ(t)$ for each unit time, from the audio bit rate $abr(t)$ for each unit time of the target content. Specifically, in consideration of a characteristic that the audio quality $AQ(t)$ degrades in response to decline of the audio bit rate $abr(t)$, the following expression (1) is used for the calculation.

$$AQ(t) = a_1 + \frac{1 - a_1}{1 + \left(\frac{abr(t)}{a_2}\right)^{a_3}} \quad (1)$$

where $abr(t)$ is a value calculated by the media parameter extractor 21 as the audio bit rate after t seconds from the playback start time of the content; and coefficients $a_1$, $a_2$, and $a_3$ are constants set in advance. In the present embodiment, the unit time is defined to be one second. In other words, for a content, the audio quality $AQ(t)$ is estimated every second, or t=1, 2, 3, . . . , (seconds). Note that t represents the elapsed time from the playback start time of a content excluding the playback stalling time caused by buffering. That is, in the case of a content for 60 seconds, t=1, 2, . . . 60 even if a playback stalling for 10 seconds occurs halfway through. However, the audio quality estimator 11 may calculate the audio quality $AQ(t)$ by using a different expression from the expression (1).

Then, based on the input video parameters, the video quality estimator 12 calculates the video quality for each unit time for the target content, and outputs the calculated video quality to the unit time quality estimator 13 (S103).

The video quality estimator 12 calculates the video quality $VQ(t)$ for each unit time, from the video bit rate $vbr(t)$, the resolution $rs(t)$, and the frame rate $fr(t)$ for the corresponding unit time of the target content. Specifically, considering a theoretically highest/greatest video quality $X(t)$ that is determined for each pair of a resolution and a frame rate; considering that a characteristic of the highest/greatest video quality $X(t)$ declines in response to decline of the resolution $rs(t)$ and the frame rate $fr(t)$; and considering a characteristic of the video quality $VQ(t)$ that declines along with the video bit rate $vbr(t)$ with respect to the above highest/greatest video quality $X(t)$, the following expressions (2) and (3) are used for the calculation.

$$VQ(t) = X(t) + \frac{1 - X(t)}{1 + \left(\frac{vbr(t)}{Y(t)}\right)^{v_1}} \quad (2)$$

$$X(t) = \frac{4(1 - \exp(-v_3 fr(t)))rs(t)}{v_2 + rs(t)} + 1 \quad (3)$$

$$Y(t) = \frac{v_4 rs(t) + v_6 \log_{10}(v_7 fr(t) + 1)}{1 - e^{-v_5 rs(t)}}$$

where $vbr(t)$ represents the video bit rate after t seconds from the playback start time of a content; $rs(t)$ represents the resolution obtained from the number of lines and the number of pixels in the vertical and horizontal directions (e.g., the total numbers of pixels, such as 1920×1080) after t seconds from the playback start time of the content, or if only the number of lines in the vertical direction or the number of pixels in the horizontal direction can be grasped, a resolution calculated by a publicly known method from the number of the lines or the number of the pixels; $fr(t)$ represents the frame rate after t seconds from the playback start time of the content that is calculated by the media parameter extractor 21; and coefficients $v_1$, $v_2$, . . . $v_7$ are constants set in advance. In the present embodiment, the video quality $VQ(t)$ is estimated every second, or t=1, 2, 3, . . . , (seconds). However, the video quality estimator 12 may calculate the video quality $VQ(t)$ by using an expression different from the expressions (2) and (3).

Then, the unit time quality estimator 13 unifies the audio quality $AQ(t)$ and the video quality $VQ(t)$, which have been input, for each unit time to calculate the audio-visual quality for each unit time, and outputs the audio-visual quality calculated for each unit time to the encoding quality estimator 14 (S104).

Specifically, the unit time quality estimator 13 calculates the audio-visual quality TAVQ(t) for each unit time by assigning weights to the audio quality AQ(t) and the video quality VQ(t) for each unit time considering their influences, as in the following expression (4).

$$TAVQ(t)=av_1+av_2 \cdot AQ(t)+av_3 \cdot VQ(t)+av_4 \cdot AQ(t) \cdot VQ(t) \quad (4)$$

where $av_1$, $av_2$, $av_3$, and $av_4$ are constants set in advance; and t represents the elapsed time (t=1, 2, 3, . . . , (seconds)) since the playback start time of the content, excluding playback stallings caused by buffering.

Then, the encoding quality estimator 14 unifies the audio-visual quality TAVQ(t) for the input unit times into a single value, to calculate audio-visual encoding quality in which only encoding degradation is taken into consideration, and outputs the calculated audio-visual encoding quality to the audio-visual quality estimator 15 (S105).

As described with Problem 2, due to influence of the forgetting effect/recency effect, temporal weights to the quality become greater while time elapses ($w_1(u)$). Also, as described with Problem 3, a lower quality has a greater influence (weight) to the eventual quality ($w_2(TAVQ(t))$). Thereupon, the encoding quality estimator 14 calculates audio-visual encoding quality CAVQ by using the following expression (5).

$$CAVQ = \frac{\sum_t w_1(u) \cdot w_2(TAVQ(t)) \cdot TAVQ(t)}{\sum_t w_1(u) \cdot w_2(TAVQ(t))} \quad (5)$$

$$w_1(u) = t_1 + t_2 \exp(u/t_3)$$

$$w_2(TAVQ(t)) = t_4 - t_5 \cdot TAVQ(t)$$

$$u = t/\text{duration}$$

where "duration" represents the time length (seconds) of an audio-visual content (net content length not including playback stalling time), which may be set, for example, in advance; t represents the elapsed time (t=1, 2, 3, . . . , (seconds)) since the playback start time; and $t_1$, $t_2$, $t_3$, $t_4$, and $t_5$ are constants set in advance.

In other words, according to the expression (5), the audio-visual quality TAVQ(t) for each unit time ranging from the start to the end of a content is assigned a greater weight while time approaches the end of the content (audio-visual encoding quality TAVQ of a time unit relatively closer the end of the content is assigned a greater weight) to calculate a weighted mean, so as to derive the audio-visual encoding quality CAVQ. In addition, in the case of audio-visual quality TAVQ(t) being small for unit times (namely, the quality is low), the influence is considered by assigning a greater weight when calculating the weighted mean, to derive the audio-visual encoding quality CAVQ.

In the present embodiment, although $w_1(u)$ is represented by an exponential function, $w_1(u)$ may be formulated by a function in which audio-visual encoding quality TAVQ of a time unit relatively closer the end of the content can be assigned a greater weight, such as a linear function or a quadratic function. Therefore, $w_1(u)$ is not limited to an exponential function. Also, although $w_2(TAVQ(t))$ is represented by a linear function, $w_2(TAVQ(t))$ may be formulated by a function in which the weight is greater if the quality is lower, such as an exponential function. Therefore, $w_2(TAVQ(t))$ is not limited to a linear function.

Note that if setting $w_1(u)=1$ or $w_2(TAVQ(t))=1$, an estimation formula is obtained in which only either one type of the weights is taken into consideration. Also, instead of introducing an estimation formula $w_2(TAVQ(T))$ that enlarges the weight for a low-quality period, an estimation formula may be adopted that makes CAVQ smaller when the number of quality decline becomes greater. Also, the sum of the number of quality improvement and the number of quality decline may be defined as the number of fluctuation, to adopt an estimation formula that gives a smaller CAVQ when the number of fluctuation becomes greater. These may be used together with $w_2(TAVQ(T))$.

Then, the audio-visual quality estimator 15 calculates audio-visual quality based on the input buffering parameters and the audio-visual encoding quality CAVQ (S106).

Specifically, the audio-visual quality estimator 15 calculates audio-visual quality AVQ perceived by a viewer in the end, based on the audio-visual encoding quality CAVQ; the buffering parameters including the total length of playback stalling time, the number of playback stallings, and the average value of playback stalling time intervals; and the time length of the audio-visual content (net content length not including playback stalling time), by using the following expression (6).

$$AVQ=1+(CAVQ-1) \cdot \exp(-\text{numofBuff}/s_1) \cdot \exp(-(\text{totalBuffLen/duration})/s_2) \cdot \exp(-(\text{avgBuffInterval/duration})/s_3) \quad (6)$$

where "duration" represents the time length of the audio-visual content (net content length not including playback stalling time); numofBuff represents the number of playback stallings; totalBuffLen represents the total length of playback stalling time; avgBuffInterval represents the average value of playback stalling time intervals; and coefficients $s_1$, $s_2$, and $s_3$ are constants set in advance.

As described with Problem 4, in order to take the influence of the content time length and playback stallings on eventual audio-visual quality into consideration, a parameter related to playback stallings is divided by the time length of the content. In the present embodiment, an exponential function is adopted to a buffering parameter, to formulate the influence. However, the expression (6) may use exponentiation, logarithm, or the like so as to be formulated with a function representing that if the number of playback stallings (numofBuff), the total length of playback stalling time (totalBuffLen), and the average value of playback stalling time intervals (avgBuffInterval) relatively increase relative to the time length of a content, the audio-visual quality AVQ perceived by a viewer in the end decreases. Also, in the present embodiment, although the formulation uses all of the number of playback stallings (numofBuff), the total length of playback stalling time (totalBuffLen), and the average value of playback stalling time intervals (avgBuffInterval), the formulation may use one of these. Furthermore, in the present embodiment, the number of playback stallings (numofBuff), the total length of playback stalling time (totalBuffLen), and the average value of playback stalling time intervals (avgBuffInterval) are used as the buffering parameters. However, for example, mean playback stalling time (avgBuffLen) obtained by dividing the total length of playback stalling time (totalBuffLen) by the number of playback stallings (numofBuff); distribution of the playback stalling time (varBuffLen); the maximum/minimum of the playback stalling time (maxBuffLen/minBuffLen); and the maximum/minimum/distribution of the playback stalling time intervals (maxBuffInterval/minBuffInterval/varBuffInterval) may be calculated to calculate the audio-visual quality AVQ perceived by a viewer in the end.

As described above, according to the present embodiment, based on the media parameters and the buffering parameters that are obtained from information of packets and the like, even in a case where the audio-visual quality changes with time, it is possible to execute quality evaluation, or it is possible to raise precision of the evaluation.

Note that the coefficients in the expressions 1 to 5 ($a_1, a_2, a_3, v_1, \ldots, v_7, aV_1, \ldots aV_4, t_1, \ldots, t_5, s_1, s_2, s_3$) may be derived by, for example, performing a subjective quality assessment experiment, and using the obtained quality assessment value and an optimization technique such as the method of least squares.

Conventionally, when estimating audio-visual quality, it is assumed to estimate a short-time audio-visual quality, and there have been problems such that when the audio-visual quality varies with time, the quality cannot be estimated (Problem 1); the audio-visual quality obtained at the completion of viewing does not take into consideration tendency of impression becoming dimmer on an earlier part of the content and remaining clearer on a recent part (Problem 2); the audio-visual quality obtained at the completion of viewing does not take into consideration that when the audio-visual quality fluctuates, the eventual audio-visual quality is strongly affected by low quality (Problem 3); and the audio-visual quality does not take into consideration dependency not only on playback stallings but also on the length of an audio-visual content (Problem 4).

In contrast, the present embodiment estimates an audio-visual quality value for each unit time (a short time, for example, one second, five seconds, or 10 seconds) from audio quality and video quality for each unit time, assigns weights to the audio-visual quality values for the unit times to unify the values, to estimate a long-time audio-visual quality (e.g., several minutes to several hours). Here, in order to take a viewer's forgetting effect/recency effect into consideration, the weight is set greater for quality at the completion of a playback of a content than for quality at the start time of the playback. Also, weights are assigned so that when the audio-visual quality fluctuates, low quality strongly affecting the eventual quality can be taken into consideration. Also, influence of the time length of an audio-visual content on playback stallings is taken into consideration, influence of the time length of an audio-visual content on playback stalling time is taken into consideration, and hence, it is possible to estimate the audio-visual quality.

Therefore, according to the present embodiment, by monitoring audio-visual quality values of a video communication service actually viewed by a viewer (namely, audio-visual quality AVQ output from an audio-visual quality estimation device 10), it is possible to easily determine whether the service being provided maintains a certain or greater level of quality to the viewer, and it is possible to grasp and manage in real time the quality of the service being provided.

Therefore, it is possible to provide improvement over the conventional technology in terms of the problems with evaluating realistic quality of a service being provided.

As above, the embodiments of the present invention have been described in detail, and note that the present invention is not limited to such specific embodiments. Note that various variations and modifications may be made within the scope of the subject matters of the present invention described in the claims.

The present patent application claims priority based on Japanese Patent Application No. 2015-244983, filed on Dec. 16, 2015, and Japanese Patent Application No. 2016-160182, filed on Aug. 17, 2016, and the entire contents of the Japanese Patent Applications are incorporated herein by reference.

LIST OF REFERENCE SYMBOLS

10 audio-visual quality estimation device
11 audio quality estimator
12 video quality estimator
13 unit time quality estimator
14 encoding quality estimator
15 audio-visual quality estimator
20 parameter extractor
21 media parameter extractor
22 buffering parameter extractor
100 drive unit
101 recording medium
102 auxiliary storage unit
103 memory unit
104 CPU
105 interface unit
B bus

The invention claimed is:

1. An audio-visual quality estimation device comprising:
processing circuitry configured to
estimate audio quality for each unit time starting from a playback start time of an audio-visual content, based on a parameter that affects the audio quality among parameters related to the content;
estimate video quality for said each unit time, based on a parameter that affects the video quality among the parameters related to the content;
unify the audio quality and the video quality for said each unit time, to estimate audio-visual quality for said each unit time;
unify the audio-visual quality for the unit times into one value, to estimate audio-visual encoding quality with respect to encoding degradation, in which temporal quality fluctuation is taken into consideration; and
estimate the audio-visual quality perceived by a viewer after an end of the content, based on the audio-visual encoding quality,
wherein the processing circuitry is configured to assign weights to the audio-visual quality such that the audio-visual quality for a unit time relatively closer to the end of the content is assigned a greater weight, and calculate a weighted mean for the audio-visual quality for the unit times, to estimate the audio-visual encoding quality.

2. An audio-visual quality estimation device comprising:
processing circuitry configured to
estimate audio quality for each unit time starting from a playback start time of an audio-visual content, based on a parameter that affects the audio quality among parameters related to the content;
estimate video quality for said each unit time, based on a parameter that affects the video quality among the parameters related to the content;
unify the audio quality and the video quality for said each unit time, to estimate audio-visual quality for said each unit time,
unify the audio-visual quality for the unit times into one value, to estimate audio-visual encoding quality with respect to encoding degradation, in which temporal quality fluctuation is taken into consideration; and estimate the audio-visual quality perceived by a viewer after an end of the content, based on the audio-visual encoding quality, wherein the processing circuitry is configured to assign weights to the audio-visual quality such that the audio-visual quality for a unit time being lower is assigned a greater weight, and calculates a weighted mean for the audio-visual quality for the unit times, to estimate the audio-visual encoding quality.

3. A method for estimating audio-visual quality executed by a computer, the method comprising:

an audio quality estimation step to estimate audio quality for each unit time starting from a playback start time of an audio-visual content, based on a parameter that affects the audio quality among parameters related to the content;

a video quality estimation step to estimate video quality for said each unit time, based on a parameter that affects the video quality among the parameters related to the content;

a unit time quality estimation step to unify the audio quality and the video quality for said each unit time, to estimate the audio-visual quality for said each unit time;

an encoding quality estimation step to unify the audio-visual quality for the unit times into one value, to estimate audio-visual encoding quality with respect to encoding degradation, in which temporal quality fluctuation is taken into consideration; and an audio-visual quality estimation step to estimate the audio-visual quality perceived by a viewer after an end of the content, based on the audio-visual encoding quality, wherein the encoding quality estimation step assigns weights to the audio-visual quality such that the audio-visual quality for a unit time relatively closer to the end of the content is assigned a greater weight, and calculates a weighted mean for the audio-visual quality for the unit times, to estimate the audio-visual encoding quality.

4. A method for estimating audio-visual quality executed by a computer, the method comprising:

an audio quality estimation step to estimate audio quality for each unit time starting from a playback start time of an audio-visual content, based on a parameter that affects the audio quality among parameters related to the content;

a video quality estimation step to estimate video quality for said each unit time, based on a parameter that affects the video quality among the parameters related to the content;

a unit time quality estimation step to unify the audio quality and the video quality for said each unit time, to estimate the audio-visual quality for said each unit time;

an encoding quality estimation step to unify the audio-visual quality for the unit times into one value, to estimate audio-visual encoding quality with respect to encoding degradation, in which temporal quality fluctuation is taken into consideration; and an audio-visual quality estimation step to estimate the audio-visual quality perceived by a viewer after an end of the content, based on the audio-visual encoding quality, wherein the encoding quality estimation step assigns weights to the audio-visual quality such that the audio-visual quality for a unit time being lower is assigned a greater weight, and calculates a weighted mean for the audio-visual quality for the unit times, to estimate the audio-visual encoding quality.

5. A non-transitory computer-readable recording medium including a program stored therein for causing a computer to execute a method for estimating audio-visual quality comprising:

an audio quality estimation step to estimate audio quality for each unit time starting from a playback start time of an audio-visual content, based on a parameter that affects the audio quality among parameters related to the content;

a video quality estimation step to estimate video quality for said each unit time, based on a parameter that affects the video quality among the parameters related to the content;

a unit time quality estimation step to unify the audio quality and the video quality for said each unit time, to estimate the audio-visual quality for said each unit time;

an encoding quality estimation step to unify the audio-visual quality for the unit times into one value, to estimate audio-visual encoding quality with respect to encoding degradation, in which temporal quality fluctuation is taken into consideration; and an audio-visual quality estimation step to estimate the audio-visual quality perceived by a viewer after an end of the content, based on the audio-visual encoding quality, wherein the encoding quality estimation step assigns weights to the audio-visual quality such that the audio-visual quality for a unit time relatively closer to the end of the content is assigned a greater weight, and calculates a weighted mean for the audio-visual quality for the unit times, to estimate the audio-visual encoding quality.

6. A non-transitory computer-readable recording medium including a program stored therein for causing a computer to execute a method for estimating audio-visual quality comprising:

an audio quality estimation step to estimate audio quality for each unit time starting from a playback start time of an audio-visual content, based on a parameter that affects the audio quality among parameters related to the content;

a video quality estimation step to estimate video quality for said each unit time, based on a parameter that affects the video quality among the parameters related to the content;

a unit time quality estimation step to unify the audio quality and the video quality for said each unit time, to estimate the audio-visual quality for said each unit time;

an encoding quality estimation step to unify the audio-visual quality for the unit times into one value, to estimate audio-visual encoding quality with respect to encoding degradation, in which temporal quality fluctuation is taken into consideration; and an audio-visual quality estimation step to estimate the audio-visual quality perceived by a viewer after an end of the content, based on the audio-visual encoding quality, wherein the encoding quality estimation step assigns weights to the audio-visual quality such that the audio-visual quality for a unit time being lower is assigned a greater weight, and calculates a weighted mean for the audio-visual quality for the unit times, to estimate the audio-visual encoding quality.

\* \* \* \* \*